United States Patent Office 2,694,823
Patented Nov. 23, 1954

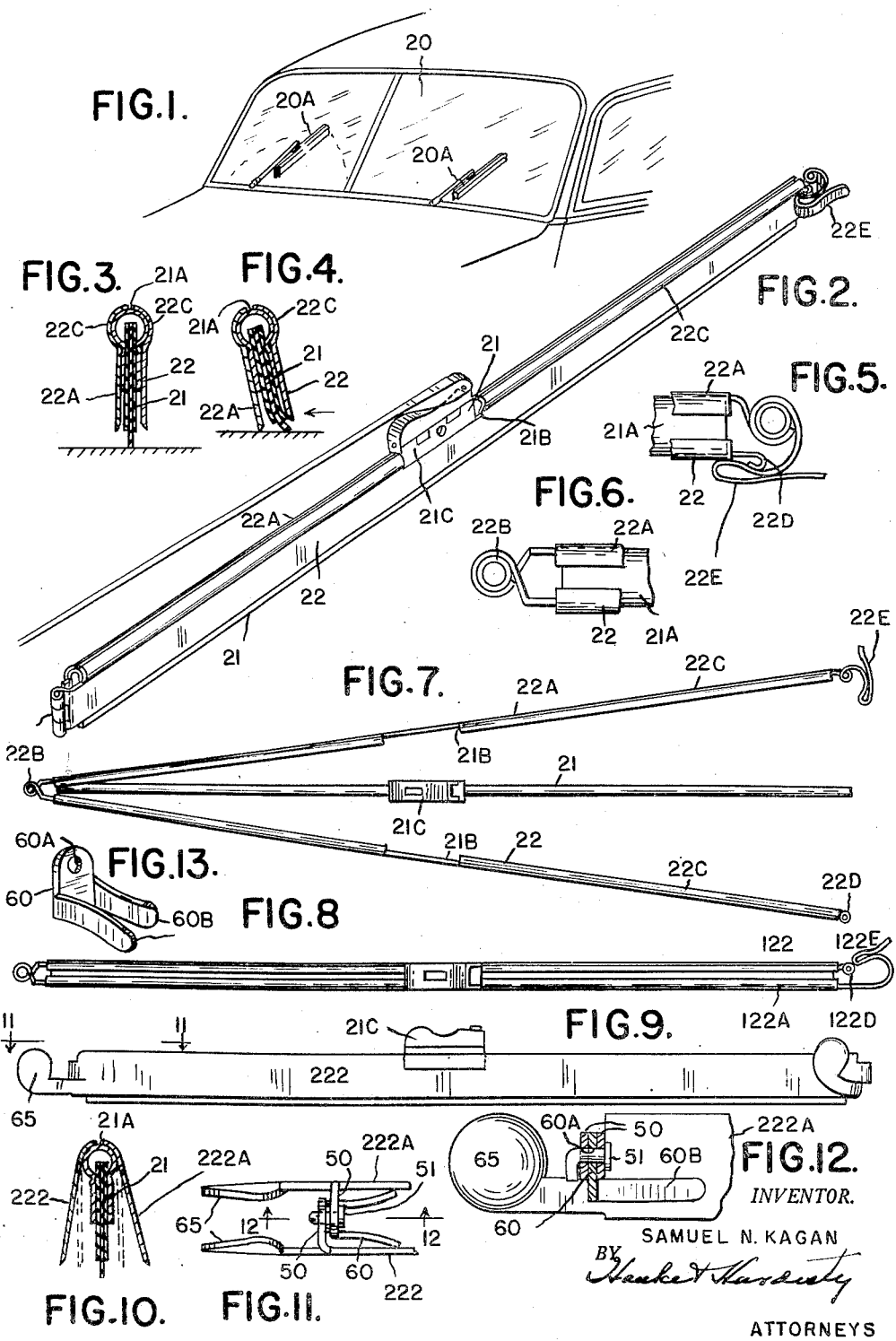

2,694,823

WINDSHIELD WIPER FOR SLEET

Samuel N. Kagan, Detroit, Mich.

Application March 23, 1950, Serial No. 151,333

2 Claims. (Cl. 15—105)

The present invention relates to ice scrapers for attachment to conventional windshield wipers and has among its objects the provision of an arrangement of metallic blades easily and quickly attached to or detached from a windshield wiper blade.

Another object is to provide a metallic blade to be attached to the conventional rubber blade so that it closely precedes the rubber blade in its travel over a windshield to scrape off ice particles or ice film.

Other objects will readily occur to those skilled in the art upon reference to the following description and the accompanying drawings in which Fig. 1 is a perspective view showing an automobile windshield and the conventional arrangement of windshield wipers.

Fig. 2 is a perspective view of a wiper blade and arm having attached thereto one embodiment of the invention.

Figs. 3 and 4 are sectional views showing respectively the idle and active positions of the blade and attachment.

Figs. 5 and 6 are enlarged plan views of the two ends of the embodiment of Fig. 2.

Fig. 7 shows, in plan, the scraper attachment open and about to be fixed to the wiper blade.

Fig. 8 is a plan view of a slightly different form of embodiment of the invention.

Fig. 9 is a side elevation of another form of embodiment of the invention.

Fig. 10 is a section of the device of Fig. 9 showing in full and dotted lines the closed and open positions of the device with the wiper blade between.

Fig. 11 is a part plan view of the device of Fig. 9 as if from line 11—11.

Fig. 12 is a section on line 12—12 of Fig. 11, and

Fig. 13 is a perspective view of the spring used in this latter form of device.

In the drawings, Fig. 1 shows a portion of the front of an automobile body with the divided windshield at 20 and a wiper 20A for each portion thereof. The wipers 20A, insofar as their operating mechanism and squeegee blades are concerned, are conventional, the blades being indicated at 21 in the larger figures.

The present invention comprises affixing to the squeegee blades 21 a pair of ice scraping blades of metal or other suitable material, one on each side of the rubber wiper blade, and by means permitting their ready application or removal.

In Figs. 2, 5, 6 and 7 the ice blades are shown as narrow blade members 22 and 22A somewhat longer and narrower than the blade 21 and hinged together at one end 22B. Along one edge portion of each of blades 22—22A it is preferred to provide a groove 22C in which is seated the rounded bead 21A of the blade 21, while the other edge of each of blades 22—22A are beveled to produce a sharp edge.

At their other ends the blades 22—22A are provided with means for fixing them together and such means is shown in Figs. 2, 5 and 7 as consisting of an extension 22D on blade 22 and a hinged or swinging member or keeper 22E adapted to swing over and engage the extension 22D.

In applying the device to the blade 21, the latter is placed between blades 22—22A and the latter swung to closed position and fixed by the keeper 22E, suitable notches 21B being provided for seating the blade mounting member 21C forming a part of the usual conventional blade 21.

As noted above, the width of blades 22—22A is somewhat less than that of the rubber blade 21 so that the latter projects when the blades 22—22A are affixed. This provides for a contact with the windshield glass of both scraper blade and squeegee blade since the wiper blades are generally so mounted as to tilt when operated. This action is illustrated in Figs. 3 and 4, the former showing the position of the blades when they have reached the end of a stroke and are in the act of reversing direction, and the latter showing their position during a wiping stroke.

In Fig. 8, there is shown another form of the present device, the only difference being in the fastening means. In this figure, one of the scraper blades 122 is provided with an extension 122D similar to extension 22D but the other blade 122A is provided with an integral spring tongue 122E adapted to snap over extension 122D to maintain the parts together.

In Figs. 9 to 13 a somewhat different embodiment is shown. In this form, the scraper blades 222—222A are shown as hinged together at both ends, one of the hinges being shown in detail in Fig. 11. In this figure each blade is shown as provided with an ear 50 provided with an opening for a pintle or hinge pin 51 and each hinge is shown as provided with a spring 60 of the form shown in Fig. 13.

This latter consists of a plate or body portion provided with an opening 60A for the passage of pintle 51 and at its lower end with spring arms 60B extending substantially at right angles to the plate portion and curved outwardly.

The spring 60 is fixed in place at the hinge and with the arms 60B below the pintle so that it tends to swing the upper edges of blades 222—222A together.

Suitable finger pads 65 may be provided, if desired.

I claim:

1. An attachment for windshield wipers provided with oscillatable blades, said attachment consisting of a pair of elongated metallic blades hinged together at both ends on a longitudinal axis, spring means attached thereto and located at one side of said axis and adapted to swing said metallic blades about said axis, and means on said metallic blades adapted to grip the oscillatable blade of said wiper when said metallic blades are thus swung.

2. An attachment for windshield wiper blades, which attachment comprises a pair of elongated metallic blades hinged together on a longitudinal axis by means of a hinge pintle, and a spring consisting of a plate provided near one end with an opening receiving said hinge pintle and near its other end with spaced diverging spring arms extending at right angles to said plate and in the same direction and bearing against the inner surfaces of the blades at one side of said axis.

References Cited in the file of this patent

UNITED STATES PATENTS

| Number | Name | Date |
|---|---|---|
| 627,432 | Mallory | June 20, 1899 |
| 761,938 | Bevan | June 7, 1904 |
| 818,002 | Swain | Apr. 17, 1906 |
| 1,650,542 | Schroyer | Nov. 22, 1927 |
| 1,845,465 | Wickstrom | Feb. 16, 1932 |
| 1,855,635 | Kelley | Apr. 26, 1932 |
| 1,859,747 | Neale | May 24, 1932 |
| 2,164,398 | Glover | July 4, 1939 |
| 2,253,249 | Peterson | Aug. 19, 1941 |